US010977548B2

(12) United States Patent
Krishnamoorthy

(10) Patent No.: US 10,977,548 B2
(45) Date of Patent: Apr. 13, 2021

(54) GENERATION OF CAPSULE NEURAL NETWORKS FOR ENHANCING IMAGE PROCESSING PLATFORMS

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 210 days.

(21) Appl. No.: 16/210,803

(22) Filed: Dec. 5, 2018

(65) Prior Publication Data

US 2020/0184314 A1 Jun. 11, 2020

(51) Int. Cl.
*G06N 3/04* (2006.01)
*G06N 3/08* (2006.01)
*G06N 20/00* (2019.01)
*G06T 5/00* (2006.01)
*G06K 9/62* (2006.01)

(52) U.S. Cl.
CPC ............ *G06N 3/0454* (2013.01); *G06N 3/08* (2013.01); *G06N 20/00* (2019.01); *G06T 5/00* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 7,689,034 B2 | 3/2010 | Terakawa | |
| 8,265,399 B2 | 9/2012 | Steinberg et al. | |
| 8,660,317 B2 | 2/2014 | Li et al. | |
| 8,660,342 B2 | 2/2014 | Obrador et al. | |
| 8,761,446 B1 | 6/2014 | Frome et al. | |
| 9,104,914 B1 | 8/2015 | Vincent et al. | |
| 9,418,458 B2 | 8/2016 | Chertok et al. | |
| 9,530,047 B1 | 12/2016 | Tang et al. | |
| 9,536,293 B2 | 1/2017 | Lin et al. | |
| 9,542,626 B2 | 1/2017 | Martinson et al. | |
| 10,255,529 B2 | 4/2019 | Rabinovich et al. | |

(Continued)

OTHER PUBLICATIONS

Hinton et al., Learning to Parse Images, Neural Information Processing Systems Conference, pp. 643-649 (Year: 2000).*

(Continued)

*Primary Examiner* — Mohammed Rachedine
(74) *Attorney, Agent, or Firm* — Michael A. Springs; Moore & Van Allen PLLC; Nicholas C. Russell

(57) ABSTRACT

Embodiments of the present invention provide a system for generating capsule neural networks for enhancing image processing platforms. The system is configured for generate capsule neural network based on instructions received form at least one user, transfer learning from an existing image processing platform to train the capsule neural network, receive input from one or more devices and provide the input to the existing image processing platform comprising a convolutional neural network, wherein the convolutional neural network processes the input, activate the capsule neural network to validate the processing of the convolutional neural network, and retrain the capsule neural network based on the validations associated with the convolutional neural network.

20 Claims, 6 Drawing Sheets

(56) References Cited

U.S. PATENT DOCUMENTS

| | | | |
|---|---|---|---|
| 10,303,977 | B2 | 5/2019 | Wshah et al. |
| 10,445,881 | B2 | 10/2019 | Spizhevoy et al. |
| 10,460,231 | B2 | 10/2019 | Zhang et al. |
| 2010/0183217 | A1 | 7/2010 | Seung et al. |
| 2010/0266200 | A1 | 10/2010 | Atallah et al. |
| 2015/0278642 | A1 | 10/2015 | Chertok et al. |
| 2016/0035078 | A1 | 2/2016 | Lin et al. |
| 2016/0335512 | A1 | 11/2016 | Bradski |
| 2017/0300785 | A1 | 10/2017 | Merhav et al. |
| 2018/0150740 | A1 | 5/2018 | Wang et al. |
| 2019/0122119 | A1* | 4/2019 | Husain .................. G06N 3/084 |
| 2019/0303742 | A1* | 10/2019 | Bonnell ............... G06N 3/0454 |
| 2020/0184314 | A1* | 6/2020 | Krishnamoorthy .. G06K 9/6273 |
| 2020/0257965 | A1* | 8/2020 | Manipatruni .......... G06N 3/063 |

OTHER PUBLICATIONS

Sabour et al., Dynamic Routing Between Capsules, Neural Information Processing Systems Conference, pp. 1-11 (Year: 2017).*

* cited by examiner

GENERATION OF CAPSULE NEURAL NETWORKS FOR ENHANCING IMAGE PROCESSING PLATFORMS

BACKGROUND

Existing image processing platforms do not have the capability to efficiently and accurately process images. As such, there exists a need for a system enhance the existing image processing platforms to improve the efficiency and accuracy associated with processing of images.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for generating capsule neural networks for enhancing the image processing platforms. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention generates capsule neural network based on instructions received form at least one user, transfers learning from an existing image processing platform to train the capsule neural network, receives input from one or more devices and provide the input to the existing image processing platform comprising the convolutional neural network, wherein the convolutional neural network processes the input, and activates the capsule neural network, wherein upon activation the capsule neural network to validate the processing of the convolutional neural network and identify that the validation of the processing of the convolutional neural network is unsuccessful.

In some embodiments, the present invention in response to identification of the unsuccessful validation, extracts a part of the input that is associated with the unsuccessful validation and transfers the part of the input to the capsule neural network to retrain the capsule neural network.

In some embodiments, the present invention in response to retraining the capsule neural network, determines the accuracy of processing of the capsule neural networks, identifies that the accuracy of the processing of the capsule neural networks is greater than predetermined threshold value, and in response to determining that the accuracy of the processing of the capsule neural networks is greater than the predetermined threshold value, decommissions the convolutional neural network and replace the convolutional neural network with the capsule neural network.

In some embodiments, the present invention determines the accuracy based on comparing processing of the capsule neural networks with one or more metrics.

In some embodiments, the present invention in response to identification of the unsuccessful validation, transfers a notification to at least one computing system.

In some embodiments, the capsule neural network in response to identifying that the validation of the processing of convolutional neural network is unsuccessful, automatically extracts a part of the input that is associated with the unsuccessful validation, automatically performs self-retraining based on the part of the input that is associated with the unsuccessful validation, automatically identifies that accuracy associated with processing of inputs is greater than a predetermined threshold, and automatically decommissions the convolutional neural network.

In some embodiments, the input received from the one or more devices comprises limited data.

In some embodiments, the capsule neural network comprises one or more capsules, wherein each of the one or more capsules process a distinct feature associated with the input.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
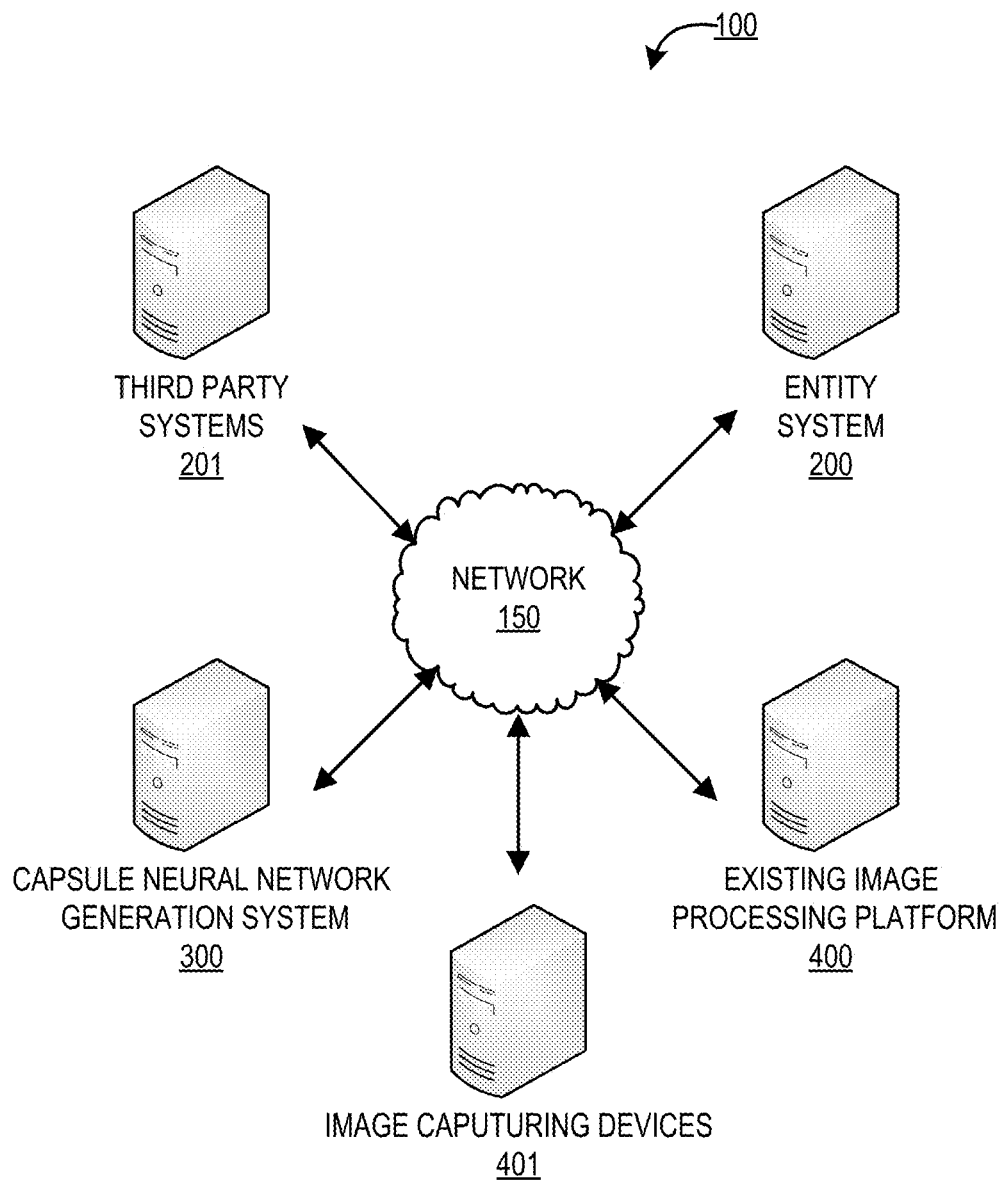
Figure 2:
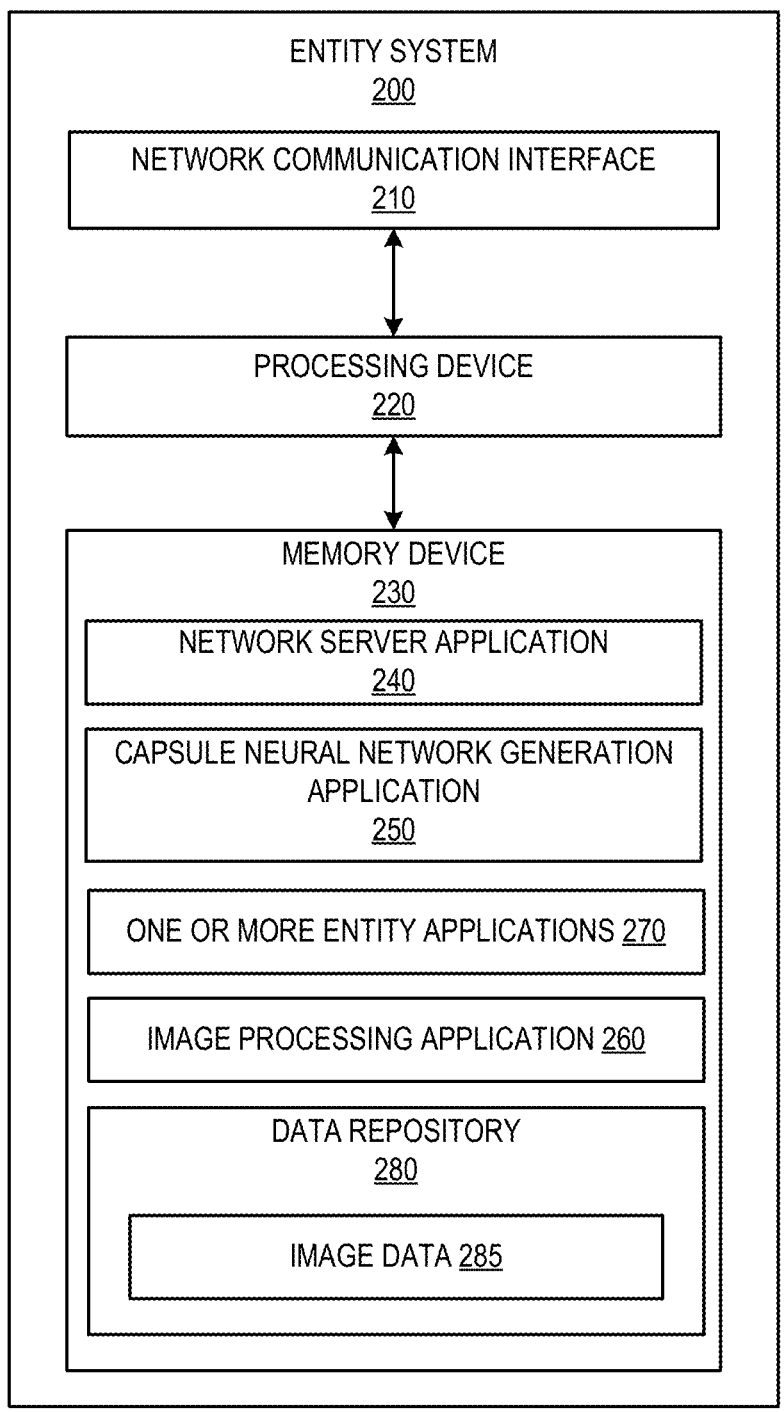
Figure 3:
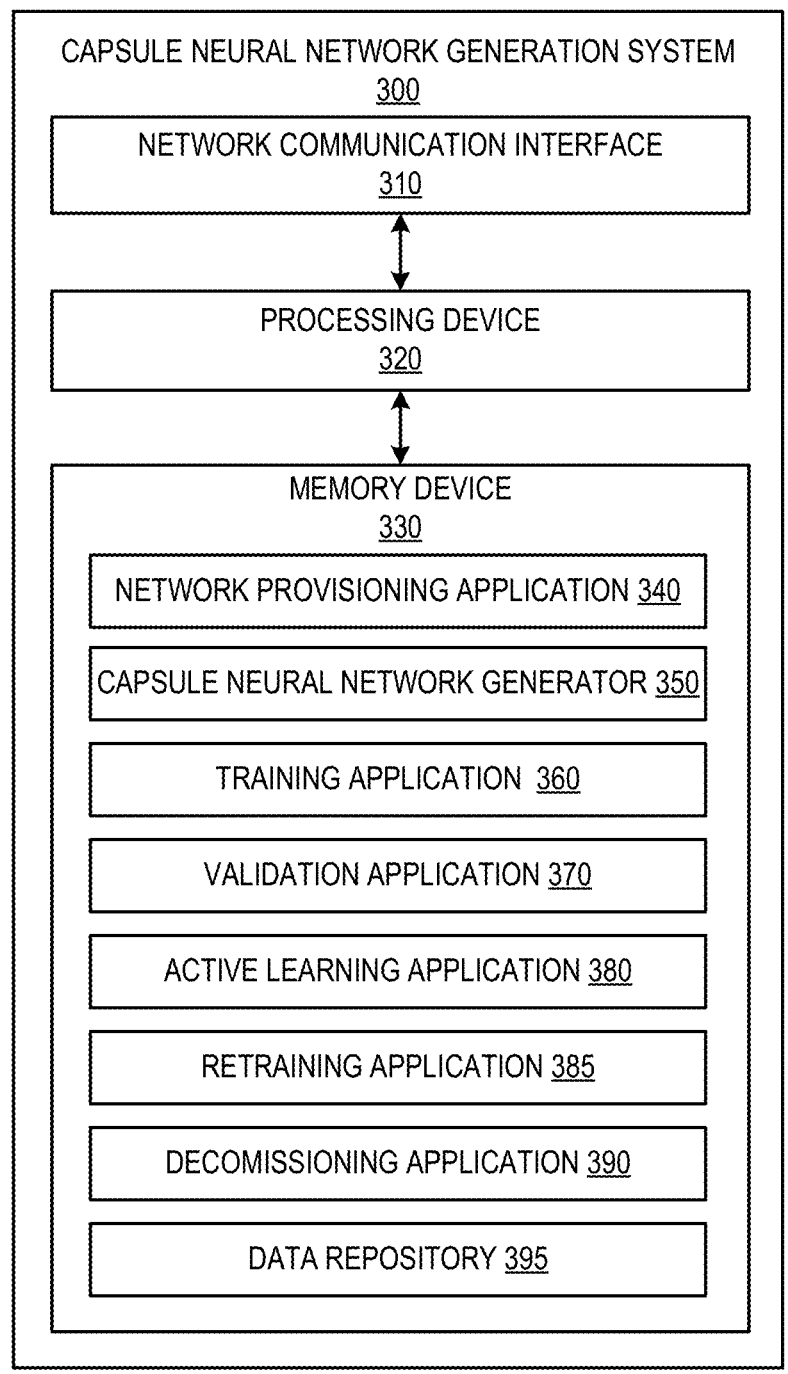
Figure 4:
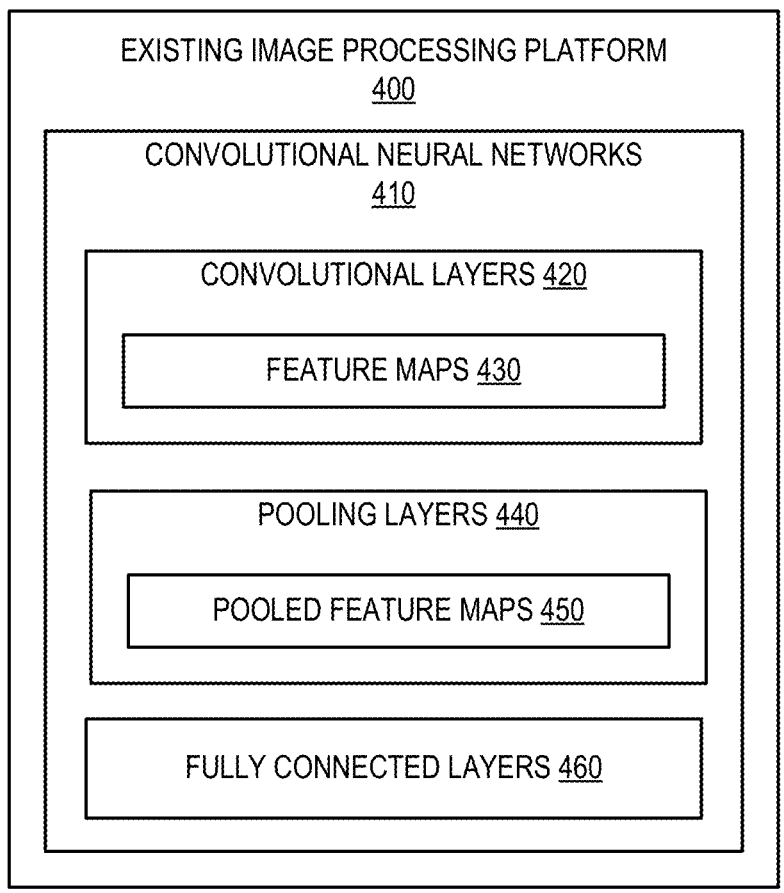
Figure 5:
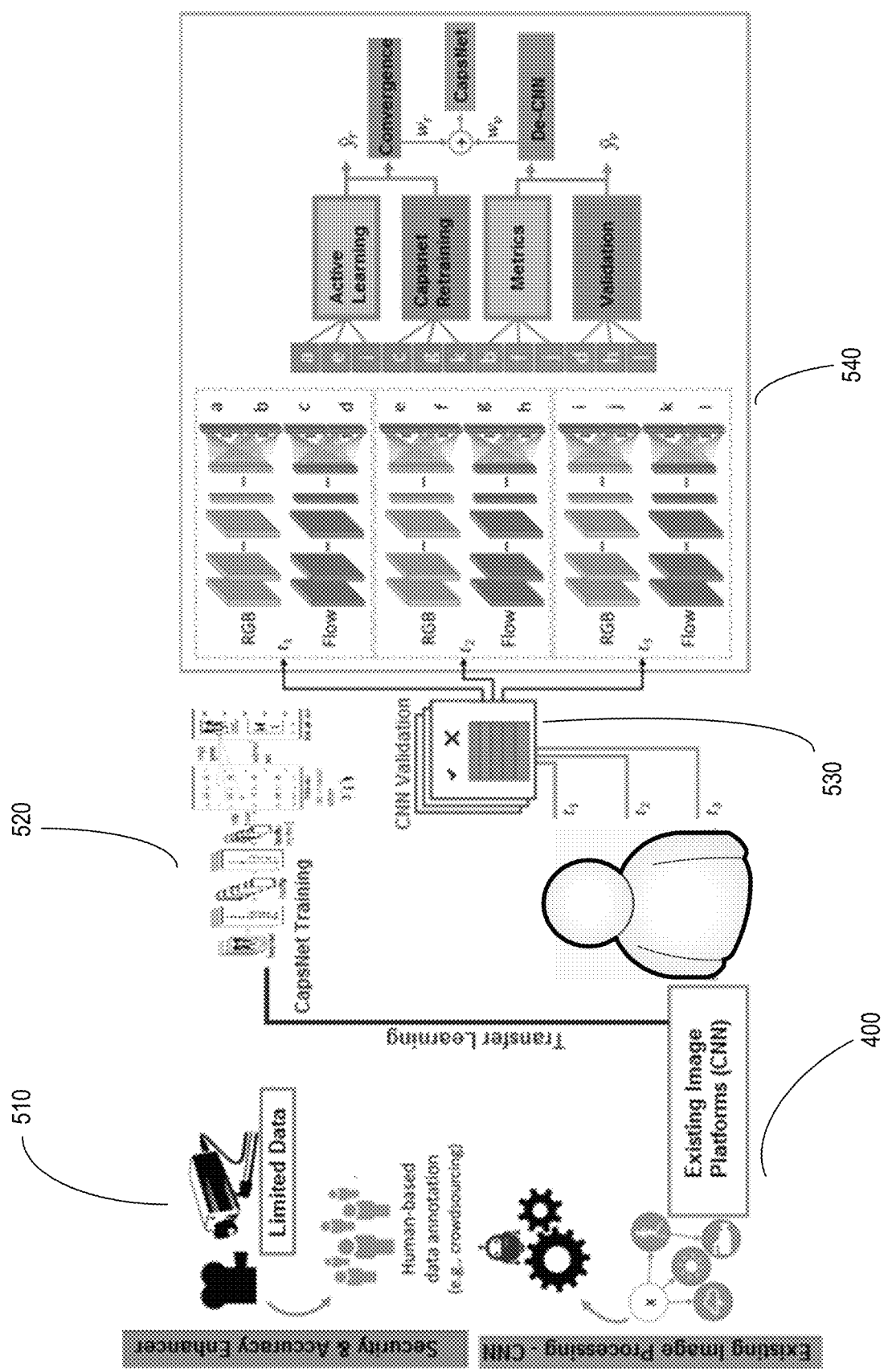
Figure 6:
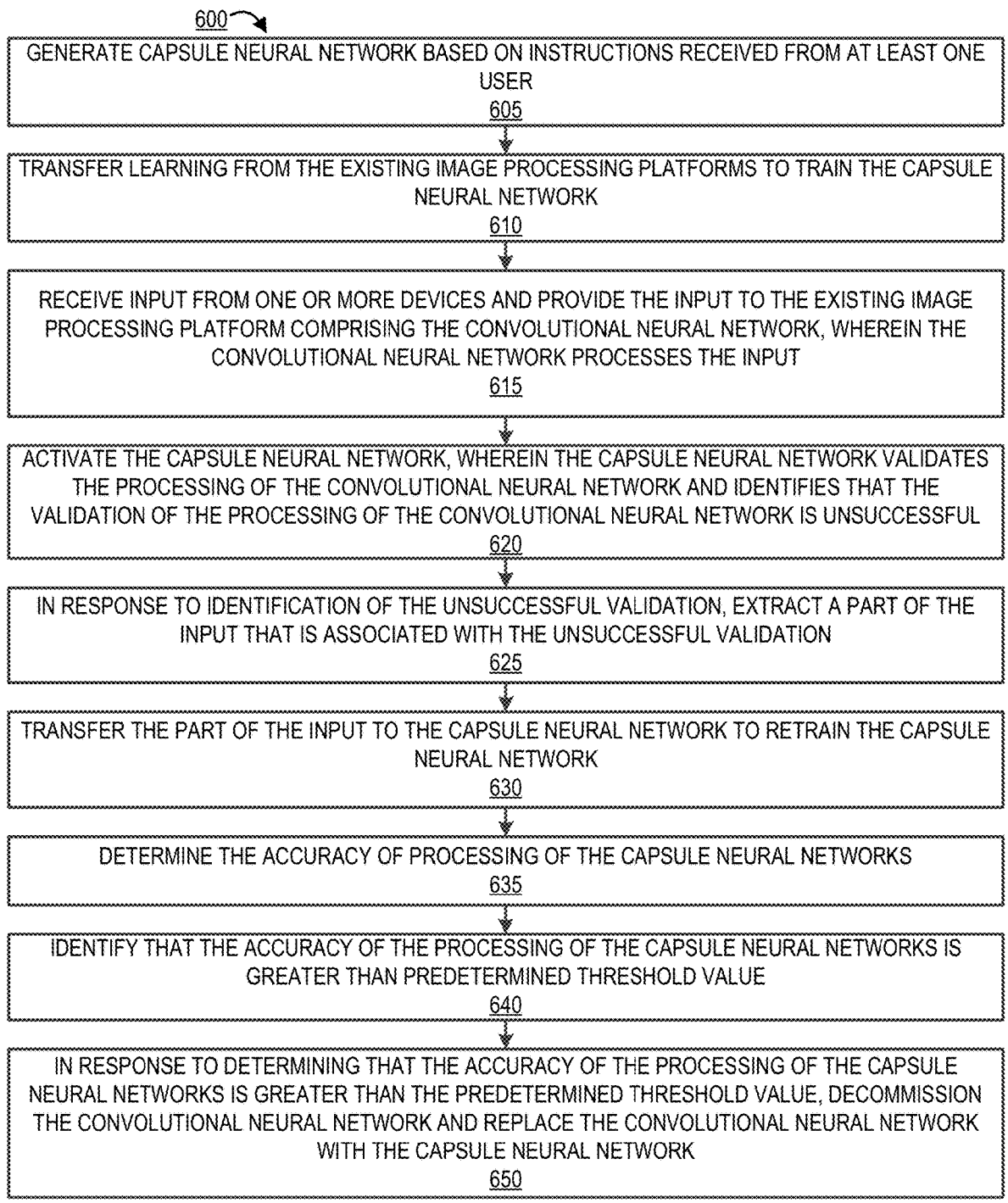

Having thus described embodiments of the invention in general terms, reference will now be made the accompanying drawings, wherein:

FIG. 1 provides a block diagram illustrating a system environment for enhancing the existing image processing platforms, in accordance with an embodiment of the invention;

FIG. 2 provides a block diagram illustrating the entity system 200 of FIG. 1, in accordance with an embodiment of the invention;

FIG. 3 provides a block diagram illustrating a capsule neural network generation system 300 of FIG. 1, in accordance with an embodiment of the invention;

FIG. 4 provides a block diagram illustrating the existing image processing platforms 400 of FIG. 1, in accordance with an embodiment of the invention;

FIG. 5 provides a block diagram illustrating the processing of the capsule neural network generation system 300 to enhance the existing image processing platforms 400, in accordance with an embodiment of the present invention; and FIG. 6 provides a flowchart illustrating a process flow for enhancing the existing image processing platforms, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Typically, Convolutional neural networks play a major role in image processing. Some applications of such convolutional neural networks may include facial recognition for providing additional security, Optical Character Recognition, and the like. Current image processing platforms comprise convolutional neural networks for processing images received from one or more image capturing devices. However, the convolutional neural networks do not take the orientation of an image and placement of various features of an image into consideration. As such, the lack of rotational invariance and consideration of important special hierarchies between features may present various challenges in image processing such as causing false positives and incorrectly assigning an object an incorrect label causing false negatives. Moreover, the convolutional neural networks comprises one or more layers and neurons in each of those layers process all the features of an image. This increases the processing speed and decreases the efficiency of image processing platforms to a great extent. Additionally, lack of encoding may cause the image processing platforms to be vulnerable to data leakages. As such, there exists a need for a system to enhance the existing image processing platforms to overcome the above mentioned technical problems.

The system of the present invention enhances the existing image processing platforms by replacing the convolutional neural networks with capsule neural networks. The capsule neural networks consider the orientation and placement of various features, thereby reducing the inconsistencies in image processing. The Capsule neural networks comprise capsules, where the capsules comprises a set of neurons that individually activate for various properties of a type of object, such as position, size, and hue. The capsule neural networks identify feature maps (e.g., collection of pixels) which will be routed through the capsules for processing. The capsules in the capsule neural network do not process all feature maps, but rather process dedicated features, thereby reducing the processing time associated with image processing and improving the efficiency of the image processing platforms. Building and training a neural network from the scratch is a time consuming process. The system of the present invention, in order to improve the efficiency of the system, generates the capsule neural networks and trains the capsule neural networks by transferring learning from the existing convolution neural networks. Additionally, the system also retrains the capsule neural networks based on validating the convolutional neural networks and training the capsule neural networks from the mistakes committed by the convolutional neural networks to improve the accuracy of the capsules neural networks. As such, the system of the present invention efficiently enhances the existing image processing platforms and improves the accuracy associated with image processing.

FIG. 1 provides a block diagram illustrating a system environment 100 for generating capsule neural networks for enhancing the existing image processing platforms, in accordance with an embodiment of the invention. As illustrated in FIG. 1, the environment 100 includes a capsule neural network generation system 300, entity system 200, an existing image processing platform 400, and image capturing devices 401. One or more users may be included in the system environment 100, where the users 110 interact with the other entities of the system environment 100 via a user interface provided by the capsule neural network generation system 300. In some embodiments, the one or more user(s) may be employees of an entity associated with the entity system 200.

The entity system(s) 200 may be any system owned or otherwise controlled by an entity to support or perform one or more process steps described herein. The entity may be any organization which uses image processing in organizational activities. In some embodiments, the entity system 200 may be associated with an entity, where the entity is a financial institution. In some embodiments, the entity may be a non-financial institution. For example, the non-financial institution may be a security provider.

The capsule neural network generation system 300 is a system of the present invention for performing one or more process steps described herein. In some embodiments, the capsule neural network generation system 300 may be an independent system. In some embodiments, the capsule neural network generation system 300 may be a part of the entity system 200.

The capsule neural network generation system 300, the entity system 200, the existing image processing platform 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the capsule neural network generation system 300 is configured to communicate information or instructions with the entity system 200, the existing image processing platform 400, and/or the third party systems 201 across the network 150. The existing image processing platform 400 may be a system owned or controlled by the entity of the entity system 200.

The existing image processing platform 400 is a system employed by the entity to process images. In some embodiments, the existing image processing platform 400 may be an independent system that is in constant communication with the entity system 200. In some embodiments, the existing image processing platform 400 may be a part of the entity system 200.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an capsule neural network generation application 250, one or more entity applications 270, an authentication application 260, and a data repository 280 comprising image data 285 and other resource data associated with the entity. The computer-executable program code of the network server application 240, the capsule neural network generation application 250, the one or more entity applications 270, and the authentication application 260 to perform certain logic, data-extraction, and data-storing functions of the entity system 200 described herein, as well as communication functions of the entity system 200.

The network server application 240, the capsule neural network generation application 250, the one or more entity applications 270, and the authentication application 260 are configured to store data in the data repository 280 or to use the data stored in the data repository 280 when communicating through the network communication interface 210 with the capsule neural network generation system 300, the existing image processing platform 400, and/or other systems to perform one or more process steps described herein. In some embodiments, the entity system 200 may receive instructions from the capsule neural network generation system 300 via the capsule neural network generation application 250 to perform certain operations. The capsule neural network generation application 250 may be provided by the capsule neural network generation system 300. The one or more entity applications 270 may be any of the applications used, created, modified, and/or managed by the entity system 200 that utilize the existing image processing platforms. In some embodiments, the authentication application 260 may be used to authenticate one or more users to access the one or more entity applications 270 and the data repository 280. The authentication application may communicate with existing image processing platform 400 to authenticate one or more users to access or modify one or more entity applications 270 and the data repository 280.

FIG. 3 provides a block diagram illustrating the capsule neural network generation system 300 in greater detail, in accordance with embodiments of the invention. As illustrated in FIG. 3, in one embodiment of the invention, the capsule neural network generation system 300 includes one or more processing devices 320 operatively coupled to a network communication interface 310 and a memory device 330. In certain embodiments, the capsule neural network generation system 300 is operated by a first entity, such as a financial institution, while in other embodiments, the capsule neural network generation system 300 is operated by an entity other than a financial institution. In some embodiments, the capsule neural network generation system 300 is owned or operated by the entity of the entity system 200. In some embodiments, the capsule neural network generation system 300 may be an independent system. In alternate embodiments, the capsule neural network generation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the capsule neural network generation system 300 described herein. For example, in one embodiment of the capsule neural network generation system 300, the memory device 330 includes, but is not limited to, a network provisioning application 340, a capsule neural network generator 350, a training application 360, a validation application 370, an active learning application 380, a retraining application 385, a decommissioning application 390, and a data repository 395 comprising data processed or accessed by one or more applications in the memory device 330. The computer-executable program code of the network provisioning application 340, the capsule neural network generator 350, the training application 360, the validation application 370, the active learning application 380, the retraining application 385, and the decommissioning application 390 may instruct the processing device 320 to perform certain logic, data-processing, and data-storing functions of the capsule neural network generation system 300 described herein, as well as communication functions of the capsule neural network generation system 300.

The network provisioning application 340, the capsule neural network generator 350, the training application 360, the validation application 370, the active learning application 380, the retraining application 385, and the decommissioning application 390 are configured to invoke or use the data in the data repository 395 when communicating through the network communication interface 310 with the entity system 200, the existing image processing platform 400, the image capturing devices 401, and other systems that may be present in the system environment 100. In some embodiments, the network provisioning application 340, the capsule neural network generator 350, the training application 360, the validation application 370, the active learning application 380, the retraining application 385, and the decommissioning application 390 may store the data extracted or received from the entity system 200, the image capturing devices 401, and the existing image processing platform 400 in the data repository 395. In some embodiments, the network provisioning application 340, the capsule neural network generator 350, the training application 360, the validation application 370, the active learning application 380, the retraining application 385, and the decommissioning application 390 may be a part of a single application.

In some embodiments, the capsule neural network generator 350 generates the capsule neural networks based on the instructions received from a user, where the user may an employee of the entity managing the capsule neural network generation system 300. In some embodiments, the training application 360 trains the generated neural networks by transferring learning from the convolutional neural networks present in the existing image processing platforms. In some embodiments, the validation application 370 causes the trained capsule neural network to validate the processing of the convolutional neural networks in the existing image processing system 400. In some embodiments, the active learning application 380 causes the trained capsule neural network to automatically learn from the validation of the processing of the convolutional neural network. In some embodiments, the retraining application 385 may create additional layers in the capsule neural networks that are associated with active learning of the capsule neural networks. In some embodiments, the decommissioning application 390 decommissions the convolutional neural networks in the existing image processing platforms based on determining that the retraining of the capsule neural networks is complete. The decommissioning application 390 also replaces the convolutional neural networks with the retrained capsule neural network upon decommissioning the convolutional neural networks.

FIG. 4 provides a block diagram illustrating the existing image processing platforms 400 of FIG. 1, in accordance with an embodiment of the invention. The existing image processing platform 400 typically comprise convolutional neural networks 410 that process the images received from image processing devices 401. An example of such image processing is facial recognition. The convolutional neural networks 410 comprise an input layers, an output layer, and multiple hidden layers. The multiple hidden layers typically consist of convolutional layers 420, pooling layers 430, and fully connected layers. Convolutional layers apply a convolution operation to the input that is being processed and pass the result to the next layers. The convolutional layers 420 process feature maps 425 associated with an image, where the feature maps are collection of pixels. Pooling layers 430 combine the outputs of neuron clusters at one layer into a single neuron in the next layer. Pooling layers 430 are shown process pooled feature maps 435. Fully connected layer 440 connect every neuron in one layer to every neuron in another layer. The neurons in each of the layers of the convolutional neuron networks process all the features associated with an image. Moreover, the convolutional neural networks merely process the process of an image and do not take the orientation of the image and placement of features into consideration while processing the image. As such, the existing neural networks may pose several challenges in image processing.

FIG. 5 provides a block diagram illustrating the processing of the capsule neural network generation system 300 to enhance the existing image processing platforms 400, in accordance with an embodiment of the present invention. The block diagram illustrated in FIG. 5 is associated with a facial recognition platform for providing security. As shown, limited data 510 is extracted from one or more image capturing devices 401 and is provided to the existing image processing platforms 400. The one or more image capturing devices 401 may include any of the image capturing equipment such as surveillance devices, or the like. Capsule neural networks 520 are generated and are trained via transfer learning from the existing image processing platforms 400 comprising convolutional neural networks. The capsule neural networks 520 generated at this point are static models and are used to validate the processing of convolutional neural networks. The capsule neural networks 520 are retrained based on the validations associated with the processing of convolutional neural networks. For example, if the convolutional neural network processes an image received from the image capturing devices incorrectly, the validation performed by the capsule neural network fails and the image associated with unsuccessful validation is used to retrain the capsule neural network in order to improve the accuracy of the capsule neural network and prevent the capsule neural network from committing the same mistake as the convolutional neural network. After retraining the processing associated with the capsule neural network is validated again based on one or more metrics. As illustrated in block 540, the internal blocks including active learning block, retraining block, metric block, and validation block perform the above operations associated with retraining of the capsule neural networks. Once the convergence is reached between the retraining and validation of the capsule neural networks, the convolutional neural networks are decommissioned and are replaced with the capsule neural networks.

FIG. 6 provide a flowchart illustrating a process flow for generating capsule neural networks for enhancing the existing image processing platforms, in accordance with an embodiment of the invention. As illustrated in block 605, the system generates capsule neural network based on instructions received from at least one user. The at least one user may be an employee of the entity managing the system of the present invention. A user interface for providing the instructions associated with the capsule neural networks may be provided by the system to the at least one user.

As illustrated in block 610, the system transfers learning from the existing image processing platforms to train the capsule neural network. The convolutional neural networks present in the existing image processing platforms may already have stored knowledge gained while solving problems. The system transfers that stored knowledge to the capsule neural networks, thereby avoiding the training of the capsule neural network from the scratch.

As illustrated in block 615, the system receives input from one or more devices and provide the input to the existing image processing platform comprising the convolutional neural network, wherein the convolutional neural network processes the input. The one or more devices may be any of the image capturing devices such as cameras, video surveillance equipment, or the like. The system may be communicating with the one or more devices and provides the input to the convolutional neural networks for processing.

As illustrated in block 620, the system activates the capsule neural network, wherein the capsule neural network validates the processing of the convolutional neural network and identifies that the validation of the processing of the convolutional neural network is unsuccessful. For example, the convolutional neural network may process an image incorrectly, thereby leading to unsuccessful validation. Since, the convolutional neural network do not take into consideration, the orientation and placement of features into consideration, the convolutional neural networks may process the input incorrectly.

As illustrated in block 625, the system in response to identification of the unsuccessful validation, extracts a part of the input that is associated with the unsuccessful validation. For example, the system extracts an image that resulted in the unsuccessful validation. In some embodiments, wherein the existing current processing platforms are used in real-time for facial recognition associated with providing access to a building, the system in response to identification of the unsuccessful validation, transmits an alert to a user computing system associated with a user that is monitoring the facial recognition process. The user may be a security personnel of the building.

As illustrated in block 630, the system transfers the part of the input to the capsule neural network to retrain the capsule neural network. The system causes the capsule neural network to actively learn from the mistakes committed by the convolutional neural networks using the part of the input. As the capsule neural networks takes into account, the orientation and placement of features, the capsule neural network may will automatically identify and modify the knowledge that is transferred from the convolutional neural networks. In some embodiments, the capsule neural network may build a new layer associated with the retraining.

As illustrated in block 635, the system determines the accuracy of processing of the capsule neural networks. The system after retraining the capsule neural networks, provides the part of the input or a different input to the capsule neural network for processing. The system further validates the processing of the capsule neural networks based on comparing the output of the capsule neural networks to one or more metrics. The one or more metrics may include quality, contrast, modulation, signal to noise ratio, and the like. In some embodiments, the one or more metrics may be presented by employees of the entity.

As illustrated in block 640, the system identifies that the accuracy of the processing of the capsule neural networks is greater than predetermined threshold value. For example, the system identifies the accuracy of processing of the capsule neural networks is greater than ninety nine percent.

As illustrated in block 645, the system in response to determining that the accuracy of the processing of the capsule neural networks is greater than the predetermined threshold value, decommissions the convolutional neural network and replaces the convolutional neural network with the capsule neural network.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generating capsule neural networks for enhancing image processing platforms, the system comprising:
   at least one transitory storage device; and
   at least one processing device coupled to the at least one non-transitory storage device, wherein the at least one processing device is configured to:
      generate capsule neural network based on instructions received form at least one user;
      transfer learning from an existing image processing platform to train the capsule neural network;
      receive input from one or more devices and provide the input to the existing image processing platform comprising a convolutional neural network, wherein the convolutional neural network processes the input;
      activate the capsule neural network, wherein upon activation the capsule neural network:
         validates processing of the convolutional neural network; and
         identifies that the validation of the processing of the convolutional neural network is unsuccessful;
      in response to the unsuccessful validation, extract a part of the input that is associated with the unsuccessful validation; and
      transfer the part of the input to the capsule neural network to retrain the capsule neural network.

2. The system of claim 1, wherein in response to retraining the capsule neural network, the at least one processing device is further configured to:
   determine accuracy associated with processing of the capsule neural network;
   identify that the accuracy associated with the processing of the capsule neural network is greater than predetermined threshold value; and
   in response to determining that the accuracy associated with the processing of the capsule neural network is greater than the predetermined threshold value, decommission the convolutional neural network and replace the convolutional neural network with the capsule neural network.

3. The system of claim 2, wherein the at least one processing is configured to determine the accuracy based on comparing processing of the capsule neural network with one or more metrics.

4. The system of claim 1, wherein in response to identification of the unsuccessful validation, the at least one processing device is further configured to transfer a notification to at least one computing system.

5. The system of claim 1, wherein the capsule neural network in response to identifying that the validation of the processing of the convolutional neural network is unsuccessful,
   automatically performs self-retraining based on the part of the input that is associated with the unsuccessful validation;
   automatically identifies that accuracy associated with processing of inputs is greater than a predetermined threshold; and
   automatically decommissions the convolutional neural network.

6. The system of claim 1, wherein the input received from the one or more devices comprises limited data.

7. The system of claim 1, wherein the capsule neural network comprises one or more capsules, wherein each of the one or more capsules process a distinct feature associated with the input.

8. A computer program product for generating capsule neural networks for enhancing image processing platforms, the computer program product comprising a non-transitory computer-readable storage medium having computer executable instructions for causing a computer processor to perform the steps of:
   generating capsule neural network based on instructions received form at least one user;
   transferring learning from an existing image processing platform to train the capsule neural network;
   receiving input from one or more devices and provide the input received from one or more devices and provide the input to the existing image processing platform comprising a convolutional neural network, wherein the convolutional neural network processes the input;
   activating the capsule neural network, wherein upon activation the capsule neural network:
      validates processing of the convolutional neural network; and
      identifies that the validation of the processing of the convolutional neural network is unsuccessful;
   in response to the unsuccessful validation, extracting a part of the input that is associated with the unsuccessful validation; and
   transferring the part of the input to the capsule neural network to retrain the capsule neural network.

9. The computer program product of claim 8, wherein in response to retraining the capsule neural network, the computer executable instructions further cause the computer processor to:
   determine accuracy associated with processing of the capsule neural network;
   identify that the accuracy associated with the processing of the capsule neural network is greater than predetermined threshold value; and
   in response to determining that the accuracy associated with the processing of the capsule neural network is greater than the predetermined threshold value, decommission the convolutional neural network and replace the convolutional neural network with the capsule neural network.

10. The computer program product of claim 9, wherein the computer executable instructions cause the computer processor to determine the accuracy based on comparing processing of the capsule neural network with one or more metrics.

11. The computer program product of claim 8, wherein in response to identification of the unsuccessful validation, the computer executable instructions further cause the computer processor to transfer a notification to at least one computing system.

12. The computer program product of claim 8, wherein the capsule neural network comprises one or more capsules, wherein each of the one or more capsules process a distinct feature associated with the input.

13. The computer program product of claim 8, wherein the capsule neural network in response to identifying that the validation of the processing of the convolutional neural network is unsuccessful,
   automatically performs self-retraining based on the part of the input that is associated with the unsuccessful validation;
   automatically identifies that accuracy associated with processing of inputs is greater than a predetermined threshold; and
   automatically decommissions the convolutional neural network.

14. The computer program product of claim 8, wherein the input received from the one or more devices comprises limited data.

15. A computerized method for generating capsule neural networks for enhancing image processing platforms, the method comprising:
   generating capsule neural network based on instructions received form at least one user;
   transferring learning from an existing image processing platform to train the capsule neural network;
   receiving input from one or more devices and provide the input to the existing image processing platform comprising a convolutional neural network, wherein the convolutional neural network processes the input;
   activating the capsule neural network, wherein upon activation the capsule neural network:
      validates processing of the convolutional neural network; and
      identifies that the validation of the processing of the convolutional neural network is unsuccessful
   in response to the unsuccessful validation, extracting a part of the input that is associated with the unsuccessful validation; and
   transferring the part of the input to the capsule neural network to retrain the capsule neural network.

16. The computerized method of claim 15, wherein retraining the capsule neural network further comprises:
   determining accuracy associated with processing of the capsule neural network;
   identifying that the accuracy associated with the processing of the capsule neural network is greater than predetermined threshold value; and
   in response to determining that the accuracy associated with the processing of the capsule neural network is greater than the predetermined threshold value, decommissioning the convolutional neural network and replace the convolutional neural network with the capsule neural network.

17. The computerized method of claim 16, wherein determining the accuracy is based on comparing processing of the capsule neural network with one or more metrics.

18. The computerized method of claim 15, wherein in response to identification of the unsuccessful validation, the computer executable instructions further cause the computer processor to transfer a notification to at least one computing system.

19. The computerized method of claim 15, wherein the capsule neural network comprises one or more capsules, wherein each of the one or more capsules process a distinct feature associated with the input.

20. The computerized method of claim 15, wherein determining the accuracy based on comparing processing of the capsule neural network with one or more metrics.

* * * * *